3,839,362
METHOD OF PRODUCTION OF 4,4-DIMETHYL-1,3-DIOXANE

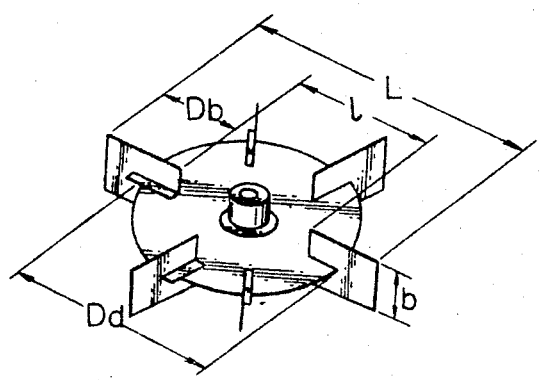
$L : l : Db : b : Dd = 1 : \frac{1}{2} : \frac{1}{4} : \frac{1}{5} : \frac{2}{3}$

Koichi Kushida, Fumio Nakahara, Toshio Kawaguchi, and Kaichi Suzuki, Kurashiki, Japan, assignors to Kurray Co., Ltd., Kurashiki, Japan
Filed Dec. 27, 1971, Ser. No. 212,141
Claims priority, application Japan, Dec. 28, 1970, 46/130,001
Int. Cl. C07d 15/04
U.S. Cl. 260—340.7    6 Claims

ABSTRACT OF THE DISCLOSURE

In the process for the production of 4,4-dimethyl-1,3-dioxane by reacting isobutylene with formaldehyde in the presence of an acidic catalyst, the improvement which comprises employing isobutylene in an amount of more than 0.5 mole per mole of formaldehyde and carrying out the reaction while stirring the reaction system under an agitation power of at least 0.4 horsepower per cubic meter and controlling the reaction in such a manner that the conversion of formaldehyde does not exceed 85 percent.

---

This invention relates to an improved method of producing 4,4-dimethyl-1,3-dioxane by reacting isobutylene and formaldehyde in the presence of an acidic catalyst.

That 4,4-dimethyl-1,3-dioxane (hereinafter referred to as MDO), an intermediate for the synthesis of isoprene, can be produced by reacting isobutylene with formaldehyde in the presence of an acidic catalyst is well known as a typical example of the Prins reaction. In practice this reaction is usually carried out in a liquid-liquid system by mixing a mixture of $C_4$ hydrocarbons containing isobutylene (usually referred to as BB fraction or $C_4$ fraction) with an acidic catalyst, such as sulfuric acid, and an aqueous formaldehyde solution, followed by heating the mixture under pressure. In the past isobutylene and formaldehyde were usually used in such a proportion that the mole ratio of isobutylene to formaldehyde was not greater than 0.5.

However, this conventional method has the shortcoming that due to the fact that formaldehyde is present in excess relative to isobutylene and that the extraction with isobutylene of the resulting MDO is poor, side reactions such as shown in the following equation (1) below are promoted, with the consequence that the selectivity for MDO (the term "selectivity," is used, to define the proportion of formaldehyde or isobutylene that is converted to MDO, calculated based on the reacted formaldehyde or isobutylene) declines. Moreover, the by-products obtained from this MDO and formaldehyde are not easily decomposed to either MDO or isobutylene and formaldehyde. Therefore, it is very desirable that the side reactions shown in equation (1) are inhibited during the reaction for synthesizing MDO.

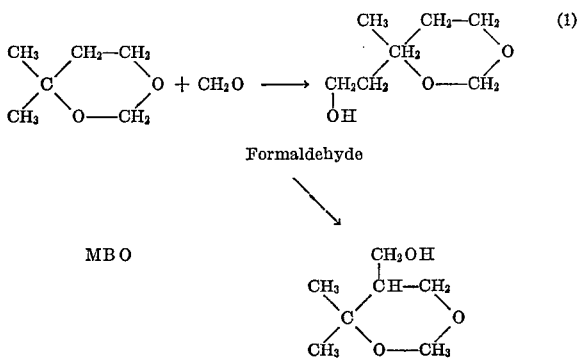

An object of the present invention is to provide a new and improved method of producing MDO, which does not possess the above described shortcoming.

Another object of this invention is to provide an effective method of agitating a reaction system consisting of isobutylene, formaldehyde and an acidic catalyst.

Further objects and advantages will be apparent from the following description and the appended claims.

FIG. 1 is a schematic view illustrating a standard flat-blade turbine, which is conveniently used for carrying out the agitation of the reaction system in practicing the method of the invention.

In accordance with the present invention an improved method of producing MDO is provided by reacting isobutylene with formaldehyde in the presence of an acidic catalyst in which isobutylene is employed in an amount of more than 0.5 mole per mole of the formaldehyde, and the reaction is carried out while stirring under an agitation power of at least 0.4 horsepower per cubic meter and the reaction is controlled in such a manner that the conversion of formaldehyde does not exceed 85 percent.

As a consequence of this improved process of the invention, not only can the side reactions shown in the foregoing equation (1) be inhibited but also the production of MDO at a high selectivity is made possible. Therefore, this process is commercially of great advantage.

These excellent results of the invention are believed to be due to the following reason: that is, when isobutylene or a $C_4$ fraction is used in excess of formaldehyde, isobutylene or other $C_4$ hydrocarbons which remain unreacted act as an extraction agent for MDO that is continuously produced as the reaction proceeds, to reduce the possibility of the contact between MDO and formaldehyde. In addition, the effective contact that is brought about between isobutylene and formaldehyde as a result of the vigorous agitation is believed to act synergistically with the foregoing extractive action to bring about the excellent results described hereinbefore.

It is important in this invention that isobutylene and formaledhyde used as the starting materials are fed to the reaction system in a specific molar relationship. It is of critical importance that the mole ratio of isobutylene to formaldehyde (isobutylene/formaldehyde) is more than 0.5/1, and preferably more than 0.65/1. No particular upper limit is impassed as to the mole ratio. However, the feeding to the reaction system of an unnecessarily great amount of isobutylene or a $C_4$ fraction containing isobutylene should be avoided, since it is uneconomical in such respects as equipment and heat required as well as the recovery operation. Therefore, it is best to hold the aforesaid mole ratio to at most 1:1.

The term "agitation power," as used herein and the appended claims, means the energy per unit time and per unit volume that is imparted to the liquid mixture to be agitated inside the reaction system. This energy can usually be imparted by any of the various agitating apparatus that are used in the agitation of a liquid-liquid mixture, such as the paddle type agitator, propeller type agitator, turbine type agitator, orifice mixer, venturi mixer, nozzle mixer, jet agitator, and the like. The preferred agitating apparatus from the standpoint of agitation efficiency is an agitator having agitating vanes, and especially an agitator having the standard flat-blade turbine, such as that shown in the accompanying drawing FIG. 1.

For imparting a desirable agitation effect to the reaction mixture in an agitation such as described, the agitation power should be at least 0.4 horsepower per cubic meter, preferably at least 0.6 horsepower per cubic meter, of the reaction mixture in the reactor, and still more preferably in the range between 0.6 and 2 horsepower per cubic meter of the reaction mixture in the reactor.

This agitation power is usually calculated as follows:

$$P = \frac{N_p P \cdot (N/60) \cdot L}{G_e \times 75}$$

wherein:

P is the agitation power (horsepower: HP),
Np is the power number (a constant differing in accordance with the class of vanes and obtained from the Rushton diagram),
p is the density of reaction liquid (kg./m.$^3$),
N is the revolution per minute (r.p.m.),
L is the diameter of the turbine (meter), and
Ge is the gravitational conversion factor (kg.-m./kg.-sec.$^2$).

The "Rushton diagram" is obtained by plotting the relation between the Reynolds Number and the Power Number (Np) of an industrial agitator on a semi-log scale as disclosed initially by J. H. Rushton, et al., in *Chemical Engineering Progress*, Vol. 46, No. 8, pp. 395–404 (1950) and Vol. 46, No. 9, pp. 467–476 (1950). The Rushton diagram shown at Vol. 46, No. 9, page 470 is the one used in this invention.

When the agitator having the standard flat-blade turbine, such as shown in FIG. 1, is used, the agitation power is frequently substituted by the "pumping capacity of the impeller." For example, the pumping capacity of the impeller Θ of the standard flat-blade turbine illustrated in FIG. 1 (L:l:b=1/2:1/5) can be calculated as follows:

$$\Theta = b(\pi L/2)^2 N$$

wherein

Θ is the pumping capacity of the impeller (m.$^3$/minute),
b is width of the vanes (meter),
L is the diameter of the turbine (meter), and
N is the revolutions per minute (r.p.m.) of the turbine.

Since the quantitative relationship between the pumping capacity of the impeller and the agitation power varies widely in accordance with the change in N and L in this case, an unqualified statement cannot be made regarding this relationship, but from the results obtained in the case of the reactor and agitator used in the hereinafter given examples it is recommended that the stirring be so carried out that the pumping capacity of the impeller resulting from the agitation becomes at least 5 cubic meters per minute, and preferably at least 7 cubic meters per minute, per cubic meter of the reaction mixture in the reactor in the case where a standard flat-blade turbine is used.

While MDO can be obtained at a high selectivity from isobutylene and formaldehyde according to the hereinbefore described novel and improved process of the instant invention, it was also found that especially good synergistic affects could be obtained when the reaction was so controlled that the conversion of formaldehyde does not exceed 85 percent, and preferably not exceed 80 percent. For example, in the case where the mole ratio of isobutylene to formaldehyde is 0.6–0.8 and the agitation power 0.7–0.9 horsepower per cubic meter, a maximum selectivity for MDO based on the converted formaldehyde (above 95 percent) can be obtained when isobutylene and formaldehyde are reacted in the presence of a sulfuric acid catalyst up to a certain point in the range of 76–85 percent conversion of formaldehyde. On the other hand, when the conversion of formaldehyde reaches above the foregoing range (i.e. above 85 percent), side reactions such as shown in the hereinbefore given equation (1) are promoted and the formed MDO is consumed resulting in a considerable drop in selectivity for MDO. For instance, the MDO selectivity declines to about 90 percent at a conversion of formaldehyde of 88 percent. Therefore, this results in a commercial disadvantage.

The restriction from the theoretical standpoint is imposed with respect to the lower limit of the conversion of formaldehyde. From the viewpoints of the cost of production and the ease of operations, the conversion of formaldehyde is preferably at least 50 percent.

The method of the invention is performed by introducing isobutylene, formaldehyde and an acidic catalyst in a specific quantitative relationship to a reaction vessel equipped with a desirable stirrer, such as an agitator having a standard flat-balde turbine and conducting the reaction with stirring under a pressure under which the reaction system can be maintained in the liquid phase at a reaction temperature of about 50–80° C. The process may be carried out either by a batchwise method or in a continuous manner.

While isobutylene having a high purity can be used as the starting material, it is particularly preferred to use a C$_4$ fraction whose isobutylene content is in the range of about 15–50 percent by weight in view of the greatness of the C$_4$ fraction's extraction effect on MDO. On the other hand, formaldehyde is generally used in the form of an aqueous solution of a concentration of 30–60 percent by weight. The acidic catalysts which can be used in the method of the invention include sulfuric acid, phosphoric acid and sulfonic acid, and the like. The most convenient acidic catalyst is sulfuric acid. The amount of formaldehyde to be fed can be such that the mole ratio of formaldehyde to catalyst (formaldehyde: catalyst) is in the range between 1:0.1 and 1:0.3.

The reaction mixture, which has been obtained by the hereinabove described method, is then separated into an organic layer and an aqueous layer either by decantation or other conventional techniques. This is followed by recovering MDO from the organic layer by, for example, distillation, while the catalyst can be recovered from the aqueous layer and recycled for reuse.

The so obtained MDO can be advantageously used for producing isoprene by catalytically decomposing the same.

The following examples are given for specifically illustrating the invention. However, the invention is not intended to be limited to these examples.

EXAMPLE I

A 10-liter vigorous agitation type reactor having an inside diameter of 150 millimeters and equipped with two standard flat-blade turbines (diameter of turbine: 50 millimeters) was continuously fed with 11 liters per hour of an aqueous formaldehyde solution (formaldehyde content: 50% by weight) 5 liters per hour of an aqueous sulfuric acid solution (sulfuric acid content: 30% by weight) and a C$_4$ fraction (isobutylene content: 45% by weight) at a flow rate indicated in Table 1, below; and the reaction was carried out at a temperature of 65° C. and under a pressure of 10 kg./cm.$^2$ gauge while stirring the liquid mixture in such an extent that the pumping capacity of the impeller was 7.5 cubic meters per minute per cubic meter of capacity of the reactor (agitation power of 0.52 horsepower per cubic meter). The results obtained are shown in Table 1.

TABLE 1

| | | | Percent | |
|---|---|---|---|---|
| Run No. | Flow rate of C$_4$ fraction (liter/hr.) | Isobutylene/ formaldehyde (mole ratio) | Conversion of formaldehyde | MDO selectivity based on reacted formaldehyde |
| 1 | 13.7 | 0.31 | 61 | 70.0 |
| 2 | 20 | 0.45 | 76 | 72.0 |
| 3 | 23 | 0.52 | 75 | 86.0 |
| 4 | 25 | 0.56 | 77 | 84.0 |
| 5 | 34 | 0.76 | 79 | 94.8 |

Run Nos. 1 and 2 of the foregoing table are controls in which the molar ratio of isobutylene to formaldehyde is outside the scope of the present invention. It can be seen that the MDO selectivity based on the reacted formaldehyde in the case of Run Nos. 1 and 2 is greatly inferior to those of Run Nos. 4 and 5, which are embodiments of the instant invention.

EXAMPLE II

Into a 10-liter vigorous agitation type reactor having an inside diameter of 150 millimeters and equipped with two standard flat-blade turbines (turbine diameter: 50 millimeters) an aqueous formaldehyde solution (formaldehyde content: 30% by weight), a concentrated sulfuric acid (sulfuric acid conent: 97% by weight) and a $C_4$ fraction having an isobutyl content indicated in Table 2, below, were fed flow rates of 18, 2 and 32.5 liters per hour, respectively; and the reaction was carried out at a temperature of 65° C. under a pressure of 10 kg./cm.$^2$ gauge while stirring the foregoing mixture to such an extent that the pumping capacity of the impeller was 8.75 cubic meters per minute per cubic meter of the capacity of the reactor (agitation power of 0.83 horsepower per cubic meter). The results obtained are shown in Table 2, below.

TABLE 2

| Run No. | Isobutylene content in $C_4$ fraction (percent by weight) | Isobutylene/ formaldehyde (mole ratio) | Percent Conversion of formaldehyde | MDO selectivity based on reacted formaldehyde |
|---|---|---|---|---|
| 1 | 22 | 0.48 | 52 | 88.0 |
| 2 | 28 | 0.51 | 65 | 92.0 |
| 3 | 31 | 0.55 | 72 | 93.2 |
| 4 | 34 | 0.61 | 71 | 93.0 |
| 5 | 42 | 0.75 | 78 | 95.8 |
| 6 | 45 | 0.80 | 80 | 96.4 |

Run No. 1 in the foregoing table is a control in which the mole ratio of isobutylene to formaldehyde is outside the scope of the instant invention. It is seen that the MDO selectivity based on the reacted formaldehyde in this case is inferior to those of Run Nos. 2–6, which are embodiments of the present invention.

EXAMPLE III

A 10-liter agitated tank reaction apparatus of an inside diameter of 150 millimeters and equipped with two standard flat-blade turbines (turbine diameter 50 millimeters) was used, and the reaction was carried out at a temperature of 60 °C. and under a pressure of 10 kg./cm.$^2$ gauge while introducing an aqueous formaldehyde solution of a concentration of 30% by weight, a concentrated sulfuric acid and a $C_4$ fraction containing 45% by weight of isobutylene into the foregoing reaction apparatus at flow rates of 18, 2 and 32 liters per hour, respectively. Reaction results such as shown in Table 3, below, were obtained by varying the agitation power. In this experiment the average residence time inside the agitation tank of the reaction liquid was about 12 minutes.

TABLE 3

| Run No. | Agitator speed (r.p.m.) | Agitation power per unit volume (HP/m.$^3$) | Pumping capacity of impeller (m.$^3$/min.) | Percent Conversion of formaldehyde | MDO selectivity based on reacted formaldehyde |
|---|---|---|---|---|---|
| 1 | 400 | 0.15 | 5.0 | 30 | 77 |
| 2 | 450 | 0.22 | 5.6 | 35 | 82 |
| 3 | 550 | 0.4 | 6.1 | 77 | 92 |
| 4 | 600 | 0.52 | 7.5 | 80 | 92 |
| 5 | 700 | 0.83 | 8.75 | 82 | 94 |
| 6 | 1,000 | 2.4 | 12.5 | 82 | 92 |

Run Nos. 1 and 2 in the foregoing table are controls in which the agitation power is outside the scope of this invention. It can be seen that in the case of these controls the conversion (rate of reaction) of formaldehyde and the selectivity for the formation of MDO are greatly inferior to those of Run Nos. 3–6, which are in conformance with the method of the invention.

By way of comparison, a pulsating extraction column type reaction apparatus not equipped with an agitator (inside diameter: 0.1 meter and height: 6 meters and equipped with perforated plates having holes of 1 millimeter in their diameter and an opening ratio of 10%, and a pulsating device) was used; and the reaction was carried out by charging to this reaction apparatus an aqueous solution of a concentration of 30% by weight at a flow rate of 18 liters per hour, a $C_4$ fraction of an isobutylene content of 45% by weight at a flow rate of 32 liters per hour and sulfuric acid at a flow rate of 2 liters per hour and countercurrently contacting the $C_4$ fraction with the aqueous formaldehyde solution and sulfuric acid, while employing the pulsating conditions of pulsatory frequency of 140 cycles per minute and a pulsatory amplitude of 10 millimeters. In this case the residence time of the reaction liquid in the reactor was about 4.7 times that of the case described in Example III, above. Notwithstanding this increased residence time, the results of the reaction were such that the conversion of formaldehyde was 78% and the selectivity for the formation of MDO based on the reacted formaldehyde was 85%.

EXAMPLE IV

An agitated tank reaction apparatus identical to that used in Example III was employed, and the reaction was carried out continuously at a temperature of 60° C. and under a pressure of 10 kg./cm.$^2$ gauge, using an aqueous formaldehyde solution of a concentration of 50% by weight, a 30% aqueous sulfuric acid solution and a $C_4$ fraction of an isobutylene content of 45% by weight. The agitator was operated at 700 r.p.m., and the agitation power per unit volume was 0.83 horsepower per cubic meter. The conversion of formaldehyde was changed by varying the residence time. The results obtained are shown in Table 4, below.

TABLE 4

| Run number | Rate of— Aqueous formaldehyde solution feed liter/hr. | $C_4$ feed (liter/ hr.) | Sulfuric acid feed (liter/hr.) | Isobutylene/ formaldehyde (mole ratio) | Percent Conversion of formaldehyde | MDO selectivity based on reacted formaldehyde |
|---|---|---|---|---|---|---|
| 1 | 20.0 | 62 | 8.7 | 0.76 | 61 | 92.7 |
| 2 | 17.0 | 53 | 7.4 | 0.76 | 67 | 93.6 |
| 3 | 11.0 | 34 | 4.8 | 0.76 | 76 | 94.8 |
| 4 | 9.0 | 28 | 3.9 | 0.76 | 83 | 93.5 |
| 5 | 7.2 | 22 | 3.1 | 0.76 | 88 | 89.5 |
| 6 | 6.0 | 19 | 2.6 | 0.76 | 91 | 87.6 |

Run Nos. 5 and 6 in the foregoing table are controls in which the conversion of formaldehyde is outside the scope of this invention. It is aparent that the selectivity for MDO formation based on the reacted formaldehyde is greatly inferior in the case of these controls as compared with those of Run Nos. 1–4, which are in conformance with the invention process.

What is claimed is:

1. In the process for the production of 4,4-dimethyl-1,3-dioxane by reacting isobutylene with formaldehyde in a liquid-liquid system in the presence of an acidic catalyst selected from the group consisting of sulfuric acid, phosphoric acid and sulfonic acid, the improvement which comprises employing isobutylene in an amount of more than 0.5 mole per mole of formaldehyde and carrying out the reaction while maintaining the conversion of formaldehyde not exceeding 85 percent by controlling the reaction conditions and stirring the reaction system under an agitation power of between 0.4 and 2 horsepower per cubic meter, said agitation power being a value calculated according to the following equation:

$$P = \frac{N_p \cdot p \cdot (N/60) \cdot L}{Ge \times 75}$$

wherein

P is the agitation power (horsepower);
$N_p$ is the power number (a constant differing in accordance with the class of vanes and obtained from the Rushton diagram);
p is the density of reaction liquid (kg./m.$^3$);
N is the revolutions per minute (r.p.m.);
L is the diameter of the turbine (meter); and
Ge is the gravitational conversion factor (kg.-m./kg.-sec.$^2$).

2. The process of Claim 1 wherein isobutylene is employed in an amount of more than 0.65 mole per mole of formaldehyde.

3. The process of Claim 1 wherein isobutylene is employed in an amount of below 1 mole per mole of formaldehyde.

4. The process of Claim 1 wherein the reaction is carried out with stirring under an agitation power of at least 0.6 horsepower per cubic meter.

5. The process of Claim 1 wherein the reaction is carried out with stirring under an agitation power of between 0.6 and 2.0 horsepower per cubic meter.

6. The process of Claim 1 wherein the reaction is carried out while maintaining the conversion of formaldehyde at a rate of between 50 and 80 percent by controlling the residence time in the reactor.

References Cited
UNITED STATES PATENTS 3,036,090    5/1962    Wheeler, et al. _____ 260—340.7

DONALD G. DAUS, Primary Examiner

J. H. TURNIPSEED, Assistant Examiner

UNITED STATES PATENT OFFICE
CERTIFICATE OF CORRECTION

Patent No. 3,839,362　　　　　　　Dated October 1, 1974

Inventor(s) Koichi KUSHIDA ET AL

It is certified that error appears in the above-identified patent and that said Letters Patent are hereby corrected as shown below:

In the Heading, correct the spelling of the Assignee to read as follows:

-- Kuraray Co., Ltd. --

Signed and sealed this 14th day of January 1975.

(SEAL)
Attest:

McCOY M. GIBSON JR.　　　　　　C. MARSHALL DANN
Attesting Officer　　　　　　　Commissioner of Patents

UNITED STATES PATENT OFFICE
CERTIFICATE OF CORRECTION

Patent No. 3,839,362          Dated October 1, 1974

Inventor(s) Koichi KUSHIDA, ET AL.

It is certified that error appears in the above-identified patent and that said Letters Patent are hereby corrected as shown below:

At column 3, lines 2-4, and at column 7, lines 3-5, change the formula to read:

$$-- \quad P = \frac{Np \cdot \mathcal{P} \cdot (N/60)^3 \cdot L^5}{Ge \times 75} \quad --$$

Signed and Sealed this sixteenth Day of March 1976

[SEAL]

Attest:

RUTH C. MASON
*Attesting Officer*

C. MARSHALL DANN
*Commissioner of Patents and Trademarks*